(12) United States Patent
Souparis

(10) Patent No.: US 9,770,935 B2
(45) Date of Patent: Sep. 26, 2017

(54) OPTICAL SECURITY COMPONENT WITH A REFLECTIVE EFFECT, PRODUCTION OF SUCH A COMPONENT AND SECURE DOCUMENT PROVIDED WITH SUCH A COMPONENT

(71) Applicant: Hologram.Industries, Bussy Saint Georges (FR)

(72) Inventor: Hugues Souparis, Paris (FR)

(73) Assignee: Hologram.Industries, Bussy Saint Georges (FR)

( * ) Notice: Subject to any disclaimer, the term of this patent is extended or adjusted under 35 U.S.C. 154(b) by 46 days.

(21) Appl. No.: 14/432,083

(22) PCT Filed: Sep. 27, 2013

(86) PCT No.: PCT/EP2013/070170
§ 371 (c)(1),
(2) Date: Mar. 27, 2015

(87) PCT Pub. No.: WO2014/049108
PCT Pub. Date: Apr. 3, 2014

(65) Prior Publication Data
US 2015/0251480 A1 Sep. 10, 2015

(30) Foreign Application Priority Data

Sep. 28, 2012 (FR) ...................... 12 59230

(51) Int. Cl.
*B42D 25/328* (2014.01)
*B42D 25/355* (2014.01)
(Continued)

(52) U.S. Cl.
CPC ........... *B42D 25/328* (2014.10); *B42D 25/29* (2014.10); *B42D 25/355* (2014.10); *G02B 1/14* (2015.01);
(Continued)

(58) Field of Classification Search
CPC .... B42D 25/328; B42D 25/29; B42D 25/355; B42D 2035/24; G02B 1/14; G02B 5/0808;
(Continued)

(56) References Cited

U.S. PATENT DOCUMENTS

2010/0307705 A1* 12/2010 Rahm ..................... B42D 25/00
162/140
2012/0074684 A1* 3/2012 Marchant ............... B42D 25/00
283/85

(Continued)

FOREIGN PATENT DOCUMENTS

EP  2 289 707 A2  3/2011
FR  2509873 A1    1/1983
(Continued)

OTHER PUBLICATIONS

International Search Report issued in PCT/EP2013/070170 mailed on Dec. 13, 2013 (6 pages).
(Continued)

*Primary Examiner* — Bumsuk Won
*Assistant Examiner* — Grant Gagnon
(74) *Attorney, Agent, or Firm* — Osha Liang LLP

(57) ABSTRACT

An optical security component designed to be observed in a spectral observation band of between 380 nm and 780 nm by direct reflection, comprising an observation face and identifiable information, the component successively including, starting from the side opposite the observation face, a first support layer, identification elements obtained by printing an absorbent material in at least part of the visible spectrum, with a low refractive index, to reproduce at least part of the identifiable information, at least part of the identification elements being structured on one of their faces opposite the face across from the support layer, to form a first subwave-
(Continued)

length grating, a second layer, with a high refractive index, covering the first support layer and the identification elements, and a third layer, with a low refractive index, transparent in the observation spectral band of the component.

20 Claims, 6 Drawing Sheets

(51) Int. Cl.
*G02B 1/14* (2015.01)
*G02B 27/42* (2006.01)
*G02B 5/08* (2006.01)
*G02B 5/18* (2006.01)
*G07D 7/12* (2016.01)
*B42D 25/29* (2014.01)
*G07D 7/00* (2016.01)

(52) U.S. Cl.
CPC ......... *G02B 5/0808* (2013.01); *G02B 5/1842* (2013.01); *G02B 27/4205* (2013.01); *G07D 7/0032* (2017.05); *G07D 7/12* (2013.01); *B42D 2035/24* (2013.01)

(58) Field of Classification Search
CPC .............. G02B 5/1842; G02B 27/4205; G07D 7/0013; G07D 7/12

USPC ........................................................ 359/567
See application file for complete search history.

(56) References Cited

U.S. PATENT DOCUMENTS

| 2013/0043670 A1* | 2/2013 | Holmes ................ G07D 7/0013 283/85 |
| 2014/0028012 A1* | 1/2014 | Petiton ................... G02B 5/008 283/85 |
| 2014/0160568 A1* | 6/2014 | Fuhse ...................... G02B 5/26 359/586 |

FOREIGN PATENT DOCUMENTS

| FR | 2838202 A1 | 10/2003 |
| JP | 2009-134094 A | 6/2009 |
| WO | 03/085425 A2 | 10/2003 |
| WO | 2004/032257 A2 | 4/2004 |
| WO | 2006/038120 A1 | 4/2006 |
| WO | 2008/095698 A1 | 8/2008 |
| WO | 2011/104551 A1 | 9/2011 |

OTHER PUBLICATIONS

Written Opinion of the International Searching Authority issued in PCT/EP2013/070170 mailed on Dec. 13, 2013 (6 pages).

* cited by examiner

FIG. 7A
FIG. 7B
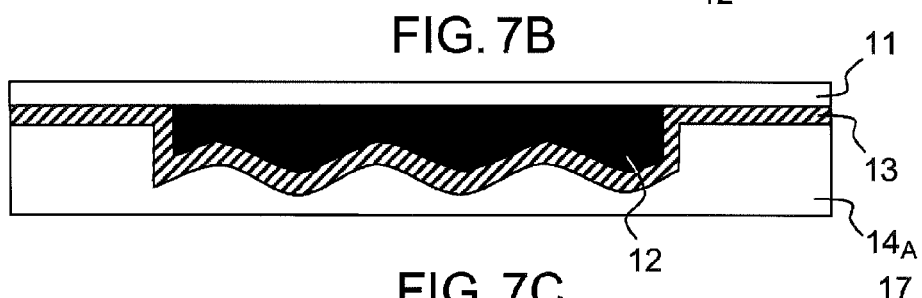
FIG. 7C
FIG. 7D
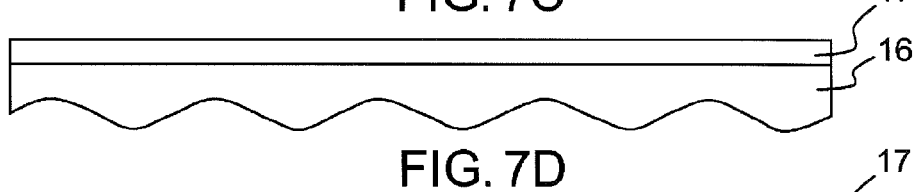
FIG. 7E
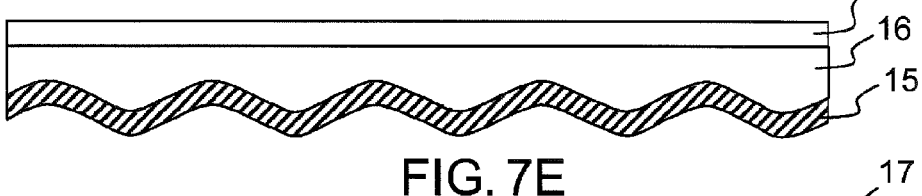
FIG. 7F
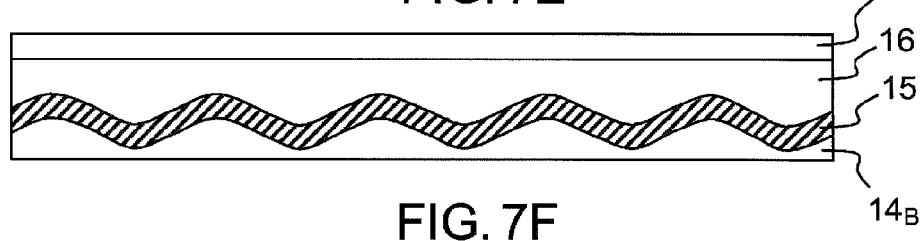
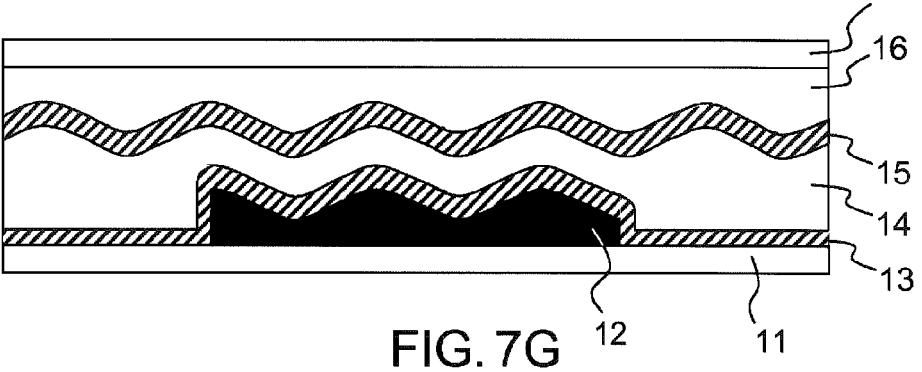
FIG. 7G

OPTICAL SECURITY COMPONENT WITH A REFLECTIVE EFFECT, PRODUCTION OF SUCH A COMPONENT AND SECURE DOCUMENT PROVIDED WITH SUCH A COMPONENT

BACKGROUND

Field of the Invention

The present invention relates to the field of security marking. More particularly, it relates to an optical security component with a reflective effect which is used to verify the authenticity of a document, and more particularly the authenticity of fiduciary documents such as banknotes.

Related Art

Security threads are a reliable and effective security element for the protection of banknotes against counterfeiting. Incorporated into the paper when the banknotes are manufactured, they form a windowed thread visible on the surface of the paper at regular intervals. Due to their complex manufacturing technique, they offer a high level of protection against counterfeiting. Security threads can reach a width of 5 mm and have multi-functional properties. In particular, they may contain information identifiable by everyone, such as a pattern, drawings, alphanumeric characters or repeating signs. They may also comprise optical security elements for authentication of a banknote, for example producing holographic effects. These optical security elements must be such that they can withstand the manufacturing constraints of the banknotes, in particular the pressure or temperature constraints relating to the drying or printing phases of the banknote.

Patent FR 2,838,202, granted in this applicant's name, describes an optical security component compatible with the production of security threads and observable by direct reflection. One such component is described in FIG. 10A. It comprises a layer made from a transparent dielectric material with a high refractive index (104) encapsulated between two low-index layers (103, 105), and structured to form a subwavelength grating. One such component, called DID (Diffractive Identification Device), behaves like a structured waveguide making it possible to excite the resonance modes which are guided at different wavelengths as a function of the polarization, the incidence angle and the azimuth. The principle of such an effect is also described within the published patent application FR 2,509,873. By direct reflection (diffraction of order 0), such a component thus acts as a wavelength subtractive filter, or pass band filter, forming a colored mirror wherein the color varies with the viewing direction. In order to increase the visibility of the effect of the orientation changes of the component, described in patent FR 2,838,202 there is the arrangement of a colored contrast layer 102 having transparent zones and colored zones, the colored zones being capable of assuming identifiable shapes.

Patent application WO 2006/038120 also describes an optical security component, one example of which is illustrated in FIG. 10B. The described component comprises two layers 121, 122 with a high refractive index, each encapsulated between layers with a low refractive index (123, 124 and 124, 125, respectively) and structured to form two observable DID type, zero order diffraction gratings. The arrangement of two superimposed gratings makes it possible to reinforce the visible variable color effects by rotating the component. The application for a security thread comprising identifiable information is not, however, disclosed.

Patent application WO 2011/104551 also describes an optical security component, one example of which is illustrated in FIG. 10C. The component described here comprises transparent colored elements (150, 154) for example made from a UV cross-linkable resin upon the surface of which microstructures 156 are formed that are capable of generating variable optical effects. A reflective layer 130 extends over all of the elements supporting the microstructures and within the laterally offset regions. Using discontinuous colored elements makes it possible to cut between the different elements in order to form multiple components more easily during the manufacturing method. Furthermore, using resins with different colors for a same component makes it possible to produce effects of different colors. The component described is applicable to security threads, but the search for a greater contrast between the different regions is not considered.

The present invention describes an optical security component that can be inspected by zero order reflection and with the naked eye by an observer, said component allowing, with respect to the components disclosed in the prior art, increased contrast regarding the information identifiable by a viewer, in particular the information borne by the security threads of the banknotes. The invention also relates to a method for producing one such component.

SUMMARY

According to a first aspect, the invention relates to an optical security component designed to be observed within a spectral observation band comprising of between 380 nm and 780 nm, by direct reflection, comprising an observation face and identifiable information. Starting from the side opposite the observation face the component successively comprises of:

a first support layer;

identification elements obtained by printing an absorbent material in at least part of the visible spectrum, with a low refractive index, to reproduce at least part of said identifiable information, at least part of the identification elements being structured on one of their faces opposite the face across from the support layer, to form a first subwavelength grating, a second layer, with a high refractive index, covering the first support layer and the identification elements, a third layer, with a low refractive index, transparent in the observation spectral band of the component, in contact with said second layer such that the first grating formed on each identification element acts at order zero as a wavelength subtractive filter, said third layer being structured upon all of its face opposite its face in contact with said second layer to form a second subwavelength grating, a fourth layer, with a high refractive index, in contact with said structured face of the third layer, a fifth layer, with a low refractive index, transparent in the spectral observation band of the component, in contact with said fourth layer, such that the second grating acts at the zero order as a wavelength subtractive filter over the entire surface of the component.

The applicant has shown that an optical security component thus structured made it possible to show the identifiable information of the component with a very contrasted colored effect relative to the peripheral zones.

According to a variation, the identification elements are formed by printing and molding a UV cross-linkable material, making it possible to have a perfect match between the identifiable information and the double waveguide structure obtained by superimposing structured layers.

According to a variation, at least a first part of the identification elements is formed by printing an absorbent material using a first color and at least a second part of the identification elements is formed by printing an absorbent material using a second color, making it possible to enrich the visible effect upon the component, and to thereby facilitate authentication.

According to a variation, the component further comprises a reflective layer arranged between the support layer and the second layer with a high refractive index, in particular making it possible to render the identification elements on the face opposite the observation face invisible.

According to a variation, the reflective layer is discontinuous, in contact with the support layer and only the identification elements.

According to a variation, the reflective layer is continuous, in contact with the entire support layer. At the periphery of the identification elements, the reflective layer eliminates the subtractive filter effect, further increasing the difference in contrast between the identification elements and the peripheral zones.

According to a variation, the component further comprises a transparent protective layer, on the side of the observation face, in particular for the application of the component to the production of security threads for banknotes.

According to a second aspect, the invention relates to a method for manufacturing an optical security component according to the first aspect, comprising:
  manufacturing a first film comprising the formation, on a first transparent support layer, of identification elements obtained by printing an absorbent material in at least part of the visible spectrum, with a low refractive index, to reproduce identifiable information, structuring at least part of the identification elements to form the first grating, and depositing a layer with a high refractive index on the identification elements and the first support layer,
  manufacturing a second film comprising the depositing, on a second transparent support layer, of a transparent layer with a low refractive index, structuring the layer with a low refractive index over its entire surface to form the second grating, and depositing a layer with a high refractive index on said layer with a low refractive index,
  depositing, on one and/or the other of the two films, a transparent interface layer, with a low refractive index, in contact with the layer with a high refractive index,
  the assembly of two films using said interface layer(s).

According to a variation, the method for manufacturing an optical security component according to the first aspect comprises:
  printing said identification elements upon a first transparent support layer and structuring at least part of said elements to form the first grating,
  depositing a layer with a high refractive index upon the identification elements and the first support layer,
  depositing a transparent layer with a low refractive index, and structuring said layer with a low refractive index over its entire surface to form the second grating,
  depositing a layer with a high refractive index upon the structured layer with a low refractive index,
  depositing a layer with a low refractive index on the layer with a high refractive index.

According to the invention, the manufacturing method may comprise the depositing of a reflective layer onto the first support layer, before printing the identification elements.

According to a variation, the manufacturing method further comprises the selective removal of the reflective layer to form a discontinuous reflective layer, the identification elements forming a demetallization mask in order to limit the contact of the reflective layer to the identification elements only.

BRIEF DESCRIPTION OF THE DRAWINGS

Other features and advantages of the invention will become apparent upon reading the following description, illustrated by the figures, in which:

FIGS. 7A to 7G, diagrams illustrating one example embodiment of an optical security component according to the invention;

In the figures, identical elements are identified using the same references.

DETAILED DESCRIPTION

Embodiments of the present invention will be described below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. The figures are shown for illustrative purposes and are not representative of the scale or shapes of the actual components.

Figure 1:
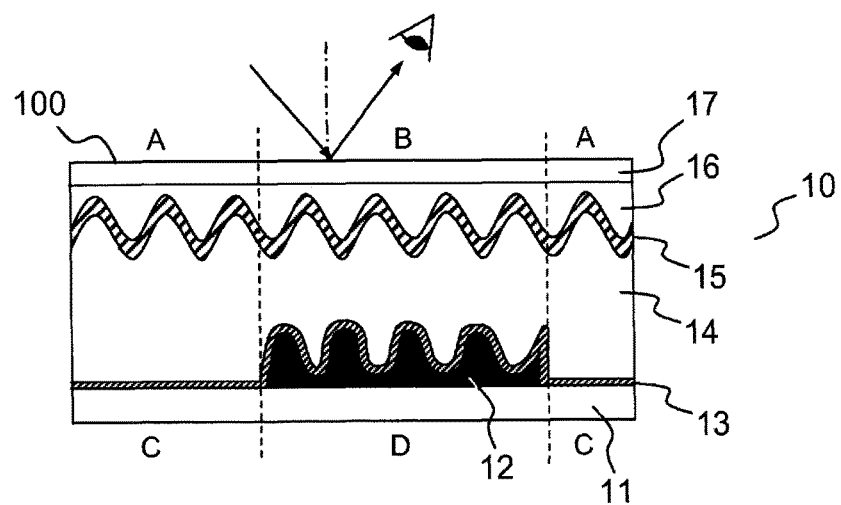
FIG. 1, a partial sectional view of an optical security component according to the invention according to a variation.
Figure 2:
FIG. 2, an example security thread incorporating an optical security device according to the variation of FIG. 1.

FIG. 1 shows a cut-away view of a first example of an optical security component 10 and FIG. 2 is an example of one such component seen from above. The component 10 is designed to be observed in the visible domain along an observation face 100 and comprises identifiable information, for example patterns, repeating signs, alphanumeric characters (for example, the letters 22 shown in FIG. 2). Successively and starting from the side opposite the observation face, it comprises a first support layer 11, identification elements 12 obtained by printing an opaque dielectric material with a low refractive index on the support element, a second layer 13 made from a dielectric material with a high refractive index, a third layer 14 made from a dielectric material with a low refractive index, transparent in the spectral observation band of the component, a fourth layer 15 made from a dielectric material with a high refractive index, and a fifth layer 16 made from a dielectric material with a low refractive index, transparent in the observation spectral band of the component.

In the rest of the description, materials with a low refractive index are materials whose refractive indices are below the refractive indices of the materials referred to as materials with a high refractive index. According to a variation, the refractive indices of the so-called high index materials are equal or substantially equal, for example comprising between 1.8 and 2.9, advantageously between 2.0 and 2.4. According to a variation, the refractive indices of the so-called low index materials are equal or substantially equal, for example comprising between 1.3 and 1.8, advantageously between 1.4 and 1.7.

The identification elements are printed on the support layer so as to reproduce at least part of the identifiable information of the component. They are obtained by printing a dielectric material, with a low index, that is opaque, i.e., absorbing all or part of the visible spectrum, and in particular in the part of the spectrum not reflected by the structures of the component forming waveguides. Advantageously, the absorption level is above 50%, preferably above 75%, and more specifically at least equal to 85%. Advantageously, the material used to form the identification elements is a UV cross-linkable material, for example a colored cross-linkable varnish. Thus, ready-to-use cross-linkable varnishes may be used, such as the Actega® 801 H varnish or reference X29 by Stensborg®, which will need to receive a dye or a pigment, for example black pigment, or it will be possible to use a UV cross-linkable black ink such as the Sericol® JD 009 ink.

As shown in FIG. 1, at least part of the identification elements are structured upon the face opposite the face across from the support layer to form, at said identification elements, a first diffraction grating, with a subwavelength period, typically a period comprised between 100 and 600 nm, and more particularly between 200 and 500 nm. The high index layer 13 covers the first support layer 11 and the identification elements 12. It is for example formed by zinc sulfide (ZnS) or titanium oxide (TiO2) or a polymer material with a high optical index, and its thickness is typically comprised of between 40 and 200 nm. The low index layer 14, for example formed by a transparent UV cross-linkable varnish, is in contact with a high index layer 13. The assembly thus formed makes it possible to obtain, at each structured identification element, at order zero, a wavelength subtractive filter, by waveguide effect in the high index layer. In other words, an observer observing the component from the observation face 100 will see a colored effect with a first color along a first orientation and a colored effect with a second color along a second orientation. Each "first" and "second" color corresponds to a spectral band of interest comprising between 380 nm and 780 nm, centered on a wavelength defined by the period and depth of the subwavelength grating, the thickness of the high index layer and the index difference between the high index and low index layers. Typically, the desired central wavelengths are around 500 nm and 630 nm, making it possible to generate green and red colors, respectively, by reflection.

Furthermore, the third transparent layer 14, with a low index, is in turn structured to form a second subwavelength diffraction grating, in contact with the fourth high index layer 15, advantageously made from the same material as the second high index layer 13, which in turn is in contact with the low index layer 16, for example a UV cross-linkable transparent embossing or thermoformable varnish. The assembly thus formed is designed to form, at order zero, a second wavelength subtractive filter, but this time over the entire surface of the component and no longer selectively at the identification elements. The period of the second diffraction grating may be identical to that of the first diffraction grating, in order to reinforce the effectiveness of the effect at a given wavelength, or on the contrary may be different from that of the first diffraction grating in order to obtain color effects with composite colors.

When the component is observed via this observation face 100, it will thus be possible to distinguish at least two types of regions, denoted A and B in FIG. 1 and respectively corresponding to the letters 22 and the peripheral regions 21 of the component seen from above (FIG. 2). In the regions A, a simple color subtractive filter effect is visible, produced only in transparent materials. In the regions B, the effect will be very contrasted with the superposition of two color subtractive filter effects obtained owing to the first and second diffraction grating, reinforced by the opacity of the embossing varnish 12 forming the identification elements, which allows local absorption of the light flow not transmitted by the waveguide structures, and thus limits the parasitic flow reflected at the identification elements. The perfect superposition of the two waveguide structures within the opaque varnish only in the location of the identifiable information of the component, for example obtained owing to the printing and molding of a UV cross-linkable material, makes it possible to obtain a component with remarkable differences in contrast between the zones bearing the identifiable information and the peripheral zones, relative to the components known from the prior art.

More specifically, it is possible to estimate the differences in contrast between regions A and B as follows. If it is assumed that the two subwavelength gratings are substantially identical and present reflection $R_{struct}$ in the spectral band of interest, and that the third layer (14) is thick enough to eliminate the interference effects (typically thickness greater than 1 μm), it is possible to estimate the total reflection RT for a double subtractive filter in the spectral band of interest by:

$$R_T = R_{struct} + (1 - R_{struct})^2 \Sigma_{k=0}^{\infty} R_{struct}^{(2k+1)} \tag{1}$$

Thus, for $R_{struct}$=60% for example, one obtains $R_T$=75%.

Assuming the residual reflection to be less than 20% of the wavelength contrast calculation, this being due to the presence of the absorbing varnish, it is then possible to estimate the contrast within the spectral band of interest as being greater than 0.88 in region B.

In the present description, contrast (or structural contrast) within the spectral bands centered on the wavelength of interest $\lambda_0$ refers to the contrast $C(\lambda_0)$ defined by:

$$C(\lambda_0) = \frac{R_{struct} - R_{res}}{R_{struct} + R_{res}} \tag{2}$$

Where $R_{struct}$ is the reflection by the structure within the spectral band of interest (for example equal to RT as defined by equation (1) in the case of double structure) and $R_{res}$ is the residual light flow diffused by the component in that same spectral band.

In the region A, there is a significant parasitic diffused flow due to the absence of the colored varnish. Furthermore, the reflection in the spectral band of interest is only $R_{struct}=60\%$. The contrast is therefore typically 0.30 in that region. A very significant difference is therefore observed in the contrast of the identifiable elements and that of the neighboring regions, allowing for excellent visibility of the information borne by the component.

FIGS. 3 to 6 illustrate other variations of a component according to the invention.

Figure 3:
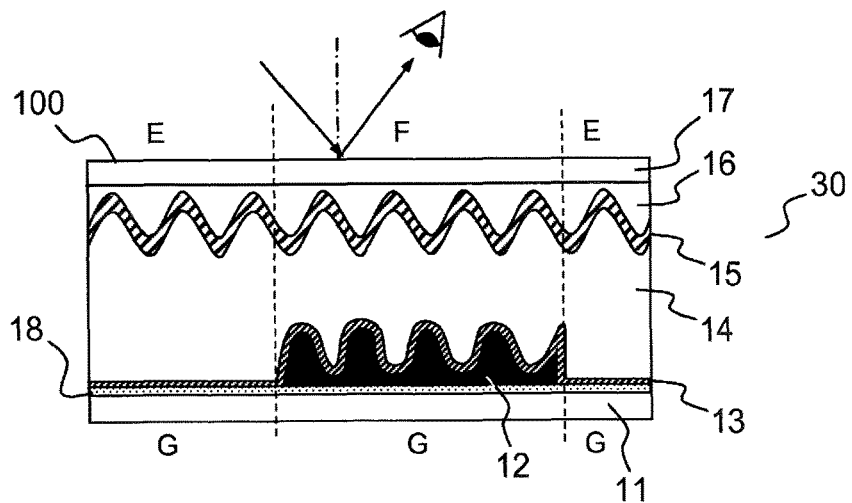
FIG. 3, a partial sectional view of an optical security component according to the invention according to another variation.

The component 30 shown in FIG. 3 is substantially identical to the component 10 shown in FIG. 1, but further comprises a reflective layer arranged between the first support layer 11 and the third second layer 13, made from a high index material. The reflective layer 18 is for example a metal layer, for example aluminum. The layer 18 can also be a white layer or a color close to that of paper. In the example of FIG. 3, it is continuous, in contact with the support layer 11 over the entire surface of the component.

During the observation of the component 30 by the observation face 100, the effect observed in the regions F corresponding to the regions comprising the identification elements 12 will be substantially the same as the effect observed in the regions B of the component 10 (FIG. 1). In fact, due to the absorption of the residual light flow by the opaque varnish, the reflective layer 18 will have little effect in these regions. In the regions denoted E and corresponding to the regions peripheral to those comprising the identification elements, the contrast of the colors will again be decreased, or even zero, the reflective layer eliminating the color subtractive filter effect by reflecting the entire visible spectrum. The contrast difference is therefore increased in a component of this type, between the identifiable elements and those of the neighboring regions.

Furthermore, the observation of the component by the face opposite the observation face will reveal a uniform face (denoted G in FIG. 3) relating to the presence of the reflective layer, typically a metal appearance. This may have the advantage relative to the component 10 (FIG. 1), for example in the application of a security thread for a banknote, of rendering the identifiable information on the back of the note completely invisible. In the component 10 (FIG. 1), an observer will see, on the face opposite the observation face, the identifiable information appearing in a dark area (region D), while the peripheral regions (regions C) will have a subtractive filter effect substantially similar to that visible in the regions A. The identifiable information will therefore continue to be perceived, but without the intense color and visible contrast effect on the front of the note.

Figure 4:
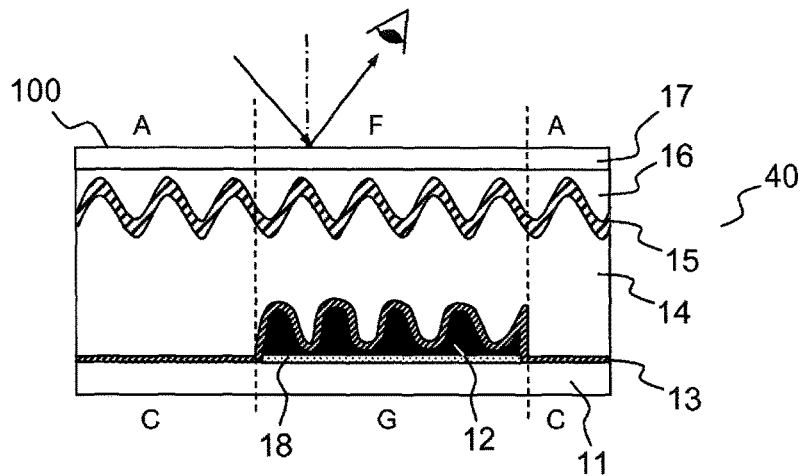
FIG. 4, a partial sectional view of an optical security component according to the invention according to another variation.

The component 40 shown in FIG. 4 is substantially identical to the component 30 shown in FIG. 3, but in this example, the reflective layer 18 is discontinuous, limited only to the locations of the identification elements 12. The two faces then have appearances (optical effects) that are even more differentiated thus allowing for an additional level of inspection.

Figure 5:
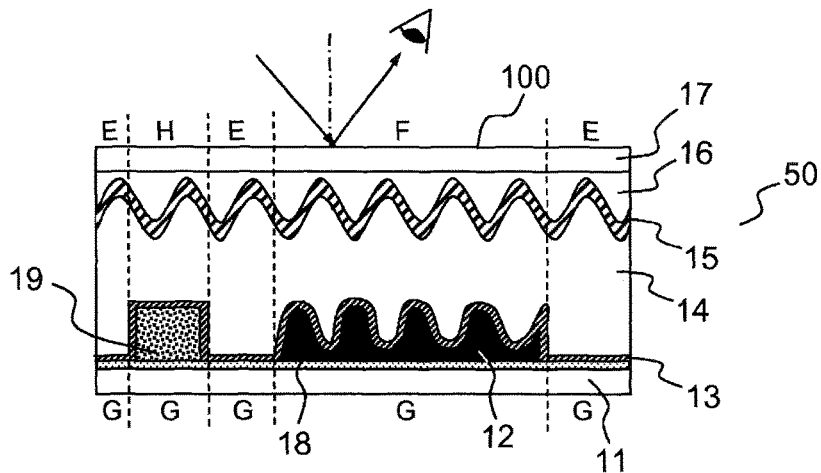
FIG. 5, a partial sectional view of an optical security component according to the invention according to another variation.
Figure 6:
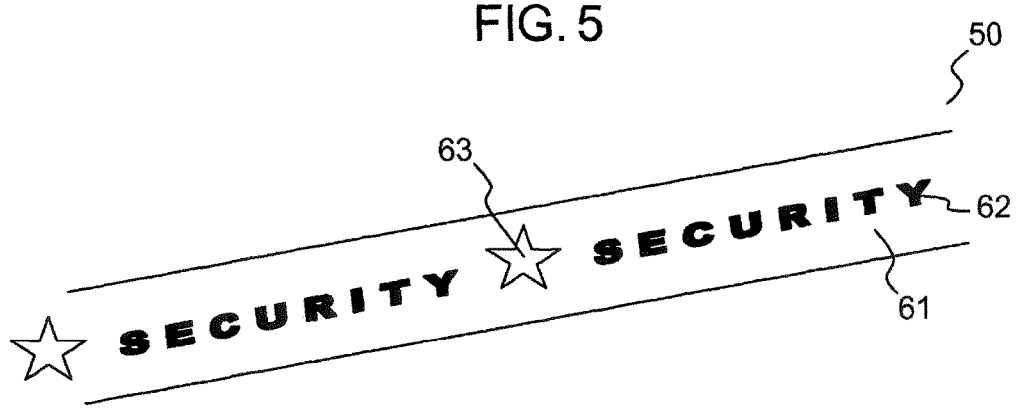
FIG. 6, an example security thread incorporating an optical security device according to the variation of FIG. 5.
Figure 8A:
FIGS. 8A to 8E, one alternative embodiment of an optical security component according to the invention.
Figure 8B:
Figure 8C:
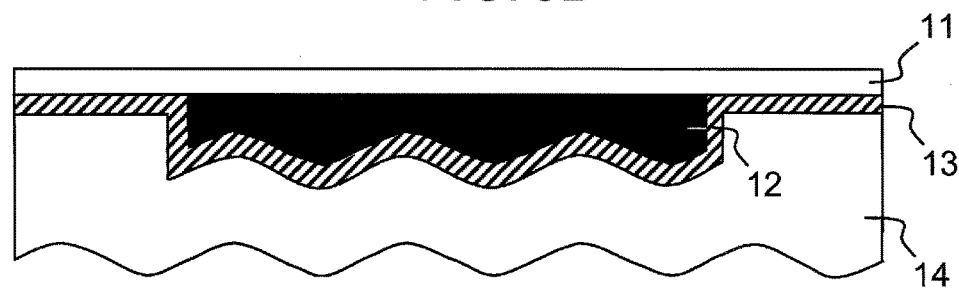
Figure 8D:
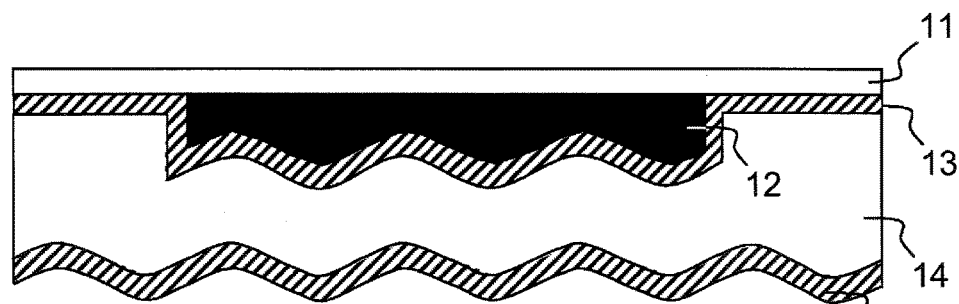
Figure 8E:
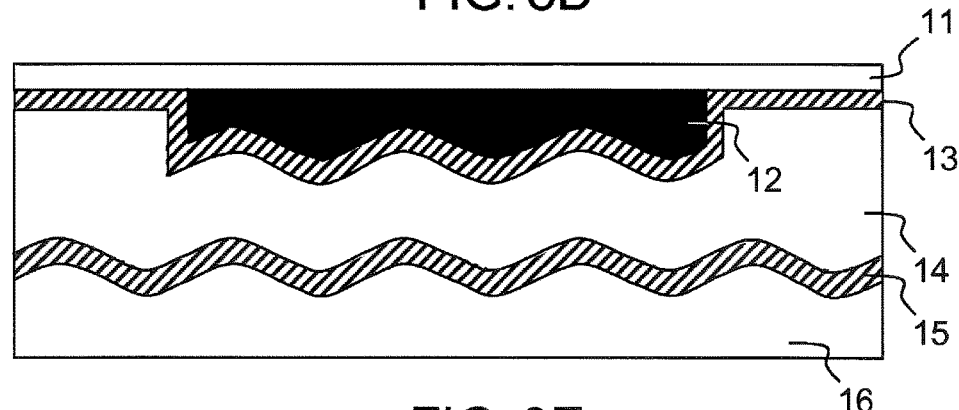

FIGS. 5 and 6 illustrate another variation of the component according to the present invention, referenced 50 in FIG. 5.

According to this variation, identification elements of different natures are arranged on a same component. For example, the component 50 comprises structured identification elements 12, as previously described, and non-structured identification elements 19. The non-structured identification elements 19 are for example made from a colored material, for example a UV cross-linkable varnish comprising a given pigment, so as to have, in the regions denoted H in FIG. 5, a given colored metal effect, for example by golden stars 63 (FIG. 6) that contrast with alphanumeric characters 62 corresponding to the regions F in FIG. 5. In the regions E peripheral to the regions F and H, only a single subtractive filter effect is visible (background 61 in FIG. 6), or, as is the case in the example of FIG. 5, an uncolored metal effect due to the presence of the reflective layer 18 that eliminates the wavelength subtractive filter effect. Alternatively, the identification elements 19 can also be structured to form a subwavelength grating, but printed with material having an absorption spectrum different from that used to form the identification elements 12 so as to form different colored effects. In the example of FIG. 5, the reflective layer 18 is continuous, arranged over the entire surface of the component between the support layer 11 and the high index layer 13, making it possible to make the visual effects produced by the identification elements 12 and 19 invisible on the back of the note, when the component is intended for a bank thread, for example.

The table below summarizes the visible effects in the different regions of the components illustrated in FIGS. 1, 3, 4, 5, by comparing these effects to those obtained in the components of the prior art ("PA") described in FIGS. 10A and 10B and identified in the table by a bold box. Across from each described effect, a level of contrast is indicated, denoted as 0 for the lowest contrast and 5 for the strongest contrast, the contrast being defined above.

TABLE 1

Figure 10A:
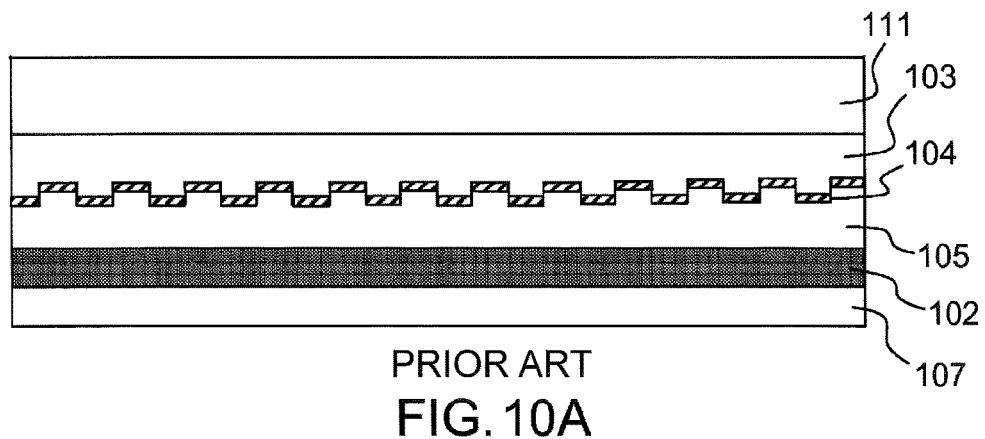
FIGS. 10A to 10C (already described), optical security component according to the prior art.
Figure 10B:
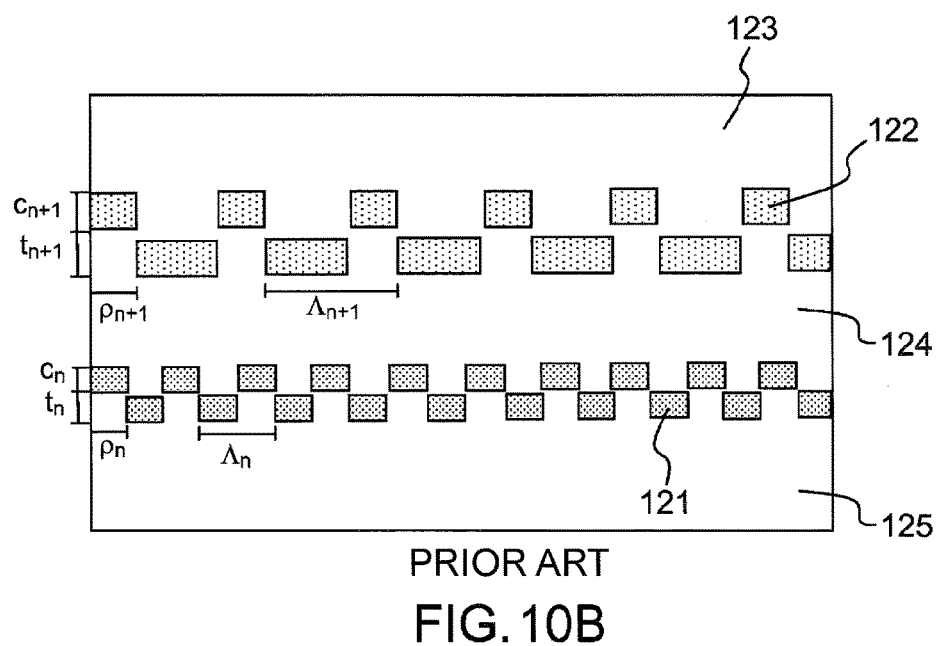
Figure 10C:
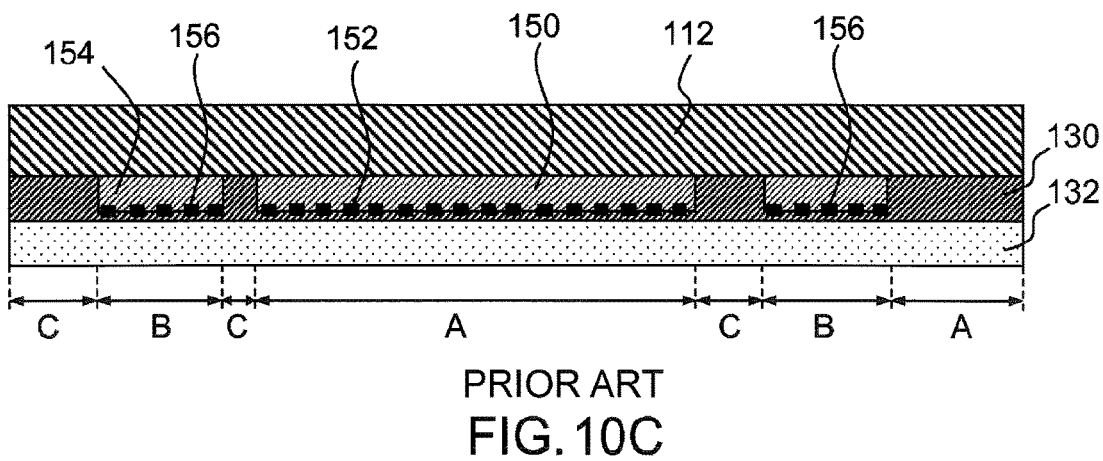

| effect | Contrast level | A | B | E | F | AA FIG. 10A | AA FIG. 10B |
|---|---|---|---|---|---|---|---|
| Uncolored metal | 0.22 | | | X | | | |
| Single subtractive filter | 0.30 | X | | | | X | |
| Double subtractive filter | 0.58 | | | | | | X |
| Single subtractive filter and contrast layer | 0.76 | | | | | X | |
| Double subtractive filter with opaque varnish | 0.88 | | X | | X | | |

As previously described, this table illustrates the contrast differences obtained with the components according to the present description (between the regions A and B, A and F, E and F, for example), much more significant than those obtained in the components of the prior art.

FIGS. 7A to 7G illustrate steps of an example method for manufacturing an optical security component as illustrated in FIG. 1.

According to this variation, a first film is manufactured (FIGS. 7A to 7C), then a second film is manufactured (FIGS. 7D to 7F), and the two films are assembled, for example by laminating (FIG. 7G).

Each of the films can be made in the following manner. Optical microstructures designed to form the first and second diffraction gratings are for example registered by means of photolithography or electron beam lithography on a photosensitive substrate or "photoresist". An electro-plating step makes it possible to attach these optical structures within a resistive material, for example with a base of Nickel, to produce a matrix or "master". According to a variation, where the gratings have identical pitches, the same matrix may be used to form the first and second gratings.

The production of the first film comprises printing the identification elements 12 on a first support layer 11 assuming the form of a coil (FIG. 7A). The support layer is for example a film of 12 µm to 50 µm made from a polymer material, for example PET (polyethylene terephthalate). The identification elements are made by printing an opaque UV cross-linkable material, having a low refractive index, for example a colored cross-linkable varnish. The printing of the cross-linkable varnish may be produced by means of printing of the photogravure, flexography or inkjet type, which in the latter case allows the printing of variable or partially variable information along the length of the coil. The identification elements then have thicknesses from 1 to 5 µm Embossing is performed starting from the matrix transferring the microstructure onto the face of at least part of the identification elements. The embossing is done by molding, then UV cross-linking (UV casting). In the event that identification elements of different natures are arranged on a same component (component 50, FIG. 5, for example), it is possible to perform double printing with two UV cross-linkable colored varnishes, one being absorbent at least in a spectral band complementary to the spectral absorption band (to form the elements 12), and the other for example semi-transparent (to form the elements 19). In the case where some of the identification elements are structured to form the first subwavelength grating and others are not structured, all of the elements can undergo embossing, but the embossing die is formed with zones having raised portions (subwavelength structures) and blank zones, such that only those identification elements designed to be structured actually are structured. A layer 13 with a high refractive index is next deposited on all of the identification elements in the support layer (step 7B), for example a layer of zinc sulfide (ZnS) with a thickness typically comprising of between 40 and 200 nm, and more particularly between 80 and 150 nm, deposited by vacuum evaporation or equivalent means. A fixing layer 14A can next be applied (step 7C), for example by a coating method, for example an adhesive layer of the glue or varnish type or a UV cast layer.

The manufacture of the second film comprises of embossing (FIG. 7D) a layer made from a dielectric material with a low index 16, typically an embossing varnish several microns thick supported by a film 17 measuring 12 µm to 50 µm made from a polymer material, for example PET (polyethylene terephthalate), made from the matrix to transfer the optical microstructure designed to form the second grating. The embossing may be performed by means of hot pressing the dielectric material (hot embossing) or molding, then a cross-linking (UV casting). Next comes the deposition (FIG. 7E), on the layer thus embossed, of a high index layer 15, for example made from ZnS, for example by vacuum evaporation, then the application (optional) of a fixing layer $14_B$ (FIG. 7F), for example an adhesive layer of the glue or varnish type via a coating method or a UV cross-linkable varnish, for example.

The two films are next assembled (FIG. 7G) by rolling, for example with the in-line deposition of a layer of UV cross-linkable glue or prior coating with a layer of reactivatable adhesive (layer 14A or 14B, for example) on the side of the high index layer, and reactivation of the glue during rolling by appropriate means.

FIGS. 8A to 8E describe an alternative for the method of manufacturing an optical security component according to the invention, as for example shown in FIG. 1.

According to this variation, as in the formation of the first film (FIGS. 7A to 7B), one proceeds (FIG. 8A) with the printing of a UV cross-linkable layer of identification elements 12 made from an opaque, low index material, on the support layer 11, for example a PET film, then the deposition (FIG. 8B) of a high index layer 13, for example a layer of ZnS. The assembly is covered with a transparent layer of low index material 14, preferably a UV cross-linkable material, thick enough to eliminate any correlation between the first and second gratings borne by the identification elements 12 and the layer 14, then the layer 14 is embossed (FIG. 8C), for example by molding, then cross-linking to form the second grating. The layer 14 thus typically has a thickness comprised between 1 and 50 µm, preferably between 1.5 and 25 µm. A layer of a high index dielectric material 15 is deposited on the embossed layer 14 (FIG. 8D), for example a layer of ZnS, then a transparent layer 16 made from a low index dielectric material is deposited (FIG. 8E), for example a protective varnish for example deposited by coating.

The result obtained at the end of the manufacturing methods respectively described using FIG. 7A to 7G or 8A to 8E is a coil that must next be cut in order to dimension compatible elements, for example with dimensions of the security thread. In the event the optical security component is designed to form a security thread, before the cutting, an additional transparent plastic film, for example a PET film, may be deposited on the layer 16 supporting the second diffraction grating, giving it the necessary solidness to resist during the manufacture of the banknote.

According to a variation, before the identification elements 12 are printed (FIGS. 7A and 8A), a reflective layer, for example a metallic layer, for example made from Aluminum, may be deposited. A component is thus obtained of the type of FIG. 3. According to a variation, after the identification elements 12 are printed, a selective removal of the reflective layer is performed. The identification elements can then act as demetallization mask, such that the reflective layer remains only within the location of the identification elements, thereby forming a component of the type shown in FIG. 4.

According to a variation, during the step for printing the identification elements 12 (FIGS. 7A, 7B), a first set of identification elements is printed in a first opaque material, for example a UV cross-linkable varnish, for example colored or black, and a second set of identification elements is printed in a second opaque material but with a different color, for example a UV cross-linkable varnish colored with another color. The high index layer 13 is next deposited, for example by vacuum evaporation, on the entire surface, covering the first and second sets of identification elements and the support layer (or the reflective layer when it exists). According to a variation, only one of said sets of identification elements is structured to form the first grating.

Figure 9A:
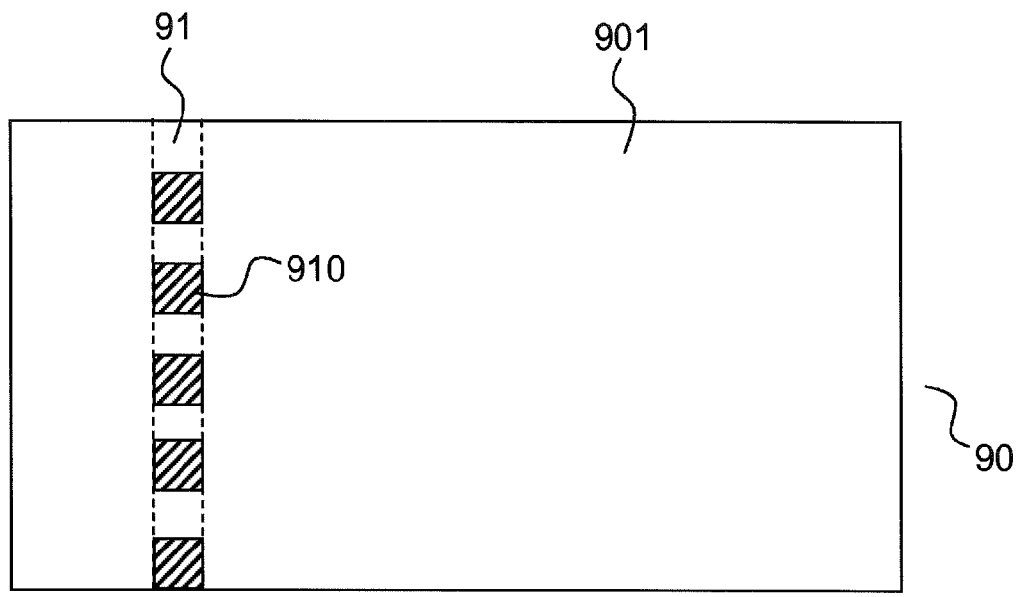
FIGS. 9A, 9B, front and back views of an example banknote incorporating a security thread formed according to one example of the invention.
Figure 9B:
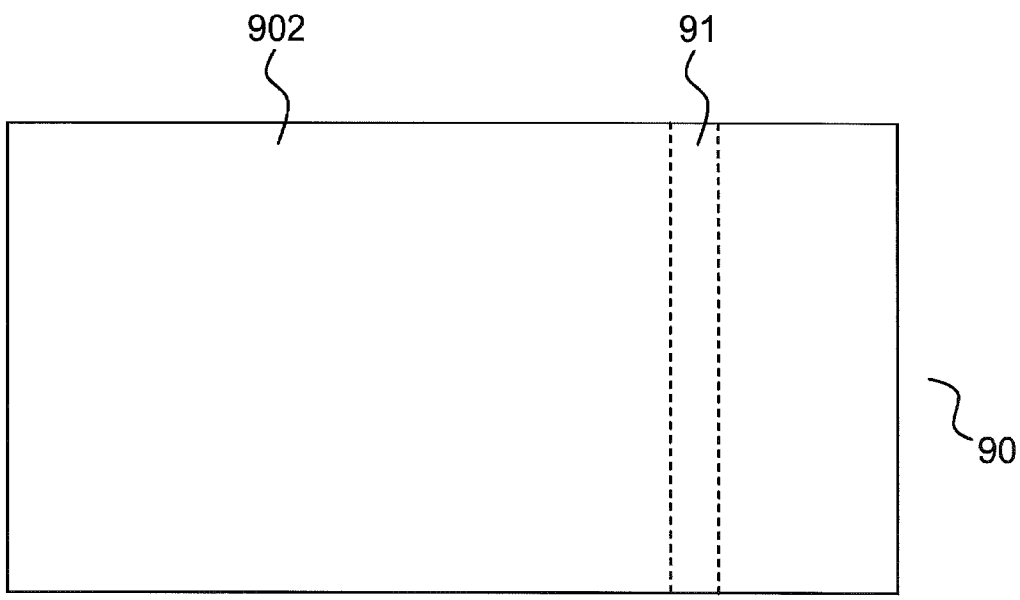

FIGS. 9A and 9B show one application example of an optical security component according to the present description. In this example, the optical security component is sized in the form of a security thread 99 measuring 1 mm, 2 mm or up to 8 and preferably 4 to 6 mm wide. It is incorporated into the banknote 90. The incorporation into the paper making pulp is performed using known methods during the manufacture of the paper for the banknote. FIG. 9A shows the front 901 of the banknote, while FIG. 9B shows its back 902. As shown in FIG. 9A, the process of incorporating the security thread into the paper makes it possible to leave only the zones 910 where the thread is on the surface of the sheet of paper visible. The identifiable information borne by the identification elements previously described will appear by reflection of order zero on the front of the note. On the back of the note, one can see that in this example, the security thread is invisible. This is for example a security thread comprising, on the face opposite the observation face, a reflective layer covering the entire surface, such as for example the layer 18 (FIG. 3 or 5).

Although the optical security component according to the invention has been described by means of a number of example embodiments, the optical security component and the manufacturing method for said component comprise different variations, modifications and improvements that will appear obviously to one skilled in the art, with the understanding that these different variations, modifications and improvements are within the scope of the invention as defined by the following claims.

In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

The invention claimed is:

1. An optical security component designed to be observed in a spectral observation band of between 380 nm and 780 nm by direct reflection, comprising an observation face and identifiable information, said component successively comprising, starting from the side opposite the observation face:
   a first support layer;
   identification elements obtained by printing an absorbent material in at least part of the visible spectrum, with a low refractive index, to reproduce at least part of said identifiable information, at least part of the identification elements being structured on one of their faces opposite the face across from the support layer, to form a first subwavelength grating;
   a second layer, with a high refractive index, covering the first support layer and the identification elements;
   a third layer, with a low refractive index, transparent in the observation spectral band of the component, in contact with said second layer such that the first grating formed on each identification element acts at order zero as a wavelength subtractive filter, said third layer being structured on all of its face opposite its face in contact with said second layer to form a second subwavelength grating,
   a fourth layer, with a high refractive index, in contact with said structured face of the third layer,
   a fifth layer, with a low refractive index, transparent in the spectral observation band of the component, in contact with said fourth layer, such that the second grating acts at the zero order as a wavelength subtractive filter over the entire surface of the component.

2. The optical security component according to claim 1, further comprising a transparent protective layer on the side of the observation face.

3. The optical security component according to claim 2, suitable for producing a security thread.

4. The optical security component according to claim 1, wherein the identification elements are formed by printing and molding a UV cross-linkable material.

5. The optical security component according to claim 4 wherein at least a first part of the identification elements is formed by printing an absorbent material with a first color and at least a second part of the identification elements is formed by printing an absorbent material with a second color.

6. The optical security component according to claim 4, further comprising a reflective layer arranged between the support layer and the second layer with a high refractive index.

7. The optical security component according to claim 4, further comprising a transparent protective layer on the side of the observation face.

8. The optical security component according to claim 1, wherein at least a first part of the identification elements is formed by printing an absorbent material with a first color and at least a second part of the identification elements is formed by printing an absorbent material with a second color.

9. The optical security component according to claim 8, further comprising a reflective layer arranged between the support layer and the second layer with a high refractive index.

10. The optical security component according to claim 8, further comprising a transparent protective layer on the side of the observation face.

11. The optical security component according to claim 1, further comprising a reflective layer arranged between the support layer and the second layer with a high refractive index.

12. The optical security component according to claim 11, further comprising a transparent protective layer on the side of the observation face.

13. The optical component according to claim 11, wherein the reflective layer is discontinuous, in contact with the support layer and the identification elements only.

14. The optical security component according to claim 13, further comprising a transparent protective layer on the side of the observation face.

15. The optical component according to claim 11, wherein the reflective layer is continuous, in contact with the entire support layer.

16. The optical security component according to claim 15, further comprising a transparent protective layer on the side of the observation face.

17. A method for manufacturing an optical security component, comprising:
   manufacturing a first film comprising the formation, on a first transparent support layer, of identification elements obtained by printing an absorbent material in at least part of the visible spectrum, with a low refractive index, to reproduce identifiable information, structuring at least part of the identification elements to form the first grating, and depositing a layer with a high refractive index on the identification elements and the first support layer;

manufacturing a second film comprising the depositing, on a second transparent support layer, of a transparent layer with a low refractive index, structuring the layer with a low refractive index over its entire surface to form the second grating, and depositing a layer with a high refractive index on said layer with a low refractive index;

depositing, on one and/or the other of the two films, a transparent interface layer, with a low refractive index, in contact with the layer with a high refractive index; and assembling two films using said interface layer(s).

18. The manufacturing method according to claim 17, comprising depositing a reflective layer on the first support layer, before printing the identification elements.

19. The manufacturing method according to claim 18, comprising the selective removal of the reflective layer to form a discontinuous reflective layer, the identification elements forming a demetallization mask to limit the contact of the reflective layer with the identification elements only.

20. A method for manufacturing an optical security component, comprising:

forming, on a first transparent support layer, identification elements obtained by printing an absorbent material in at least part of the visible spectrum, with a low refractive index, to reproduce identifiable information and structuring at least part of said elements to form the first grating, depositing a layer with a high refractive index on the identification elements and the first support layer, depositing a transparent layer with a low refractive index, and structuring said layer with a low refractive index over its entire surface to form the second grating, depositing a layer with a high refractive index on the structured layer with a low refractive index, depositing a layer with a low refractive index on the layer with a high refractive index.

* * * * *